United States Patent
Ferencak

(10) Patent No.: US 9,765,680 B2
(45) Date of Patent: Sep. 19, 2017

(54) SUPPORT RING FOR AN EXHAUST GAS DUCT SYSTEM

(71) Applicant: Eberspächer Exhaust Technology GmbH & Co. KG, Neunkirchen (DE)

(72) Inventor: Marcel Ferencak, Ostfildern (DE)

(73) Assignee: Eberspächer Exhaust Technology GmbH & Co. KG, Neunkirchen (DE)

(*) Notice: Subject to any disclaimer, the term of this patent is extended or adjusted under 35 U.S.C. 154(b) by 0 days.

(21) Appl. No.: 14/994,553

(22) Filed: Jan. 13, 2016

(65) Prior Publication Data

US 2016/0208673 A1   Jul. 21, 2016

(30) Foreign Application Priority Data

Jan. 15, 2015   (DE) .................. 10 2015 100 552

(51) Int. Cl.
| | | |
|---|---|---|
| *F01N 3/20* | (2006.01) | |
| *F01N 3/28* | (2006.01) | |
| *F01N 13/18* | (2010.01) | |
| *F01N 3/021* | (2006.01) | |
| *F01N 13/08* | (2010.01) | |
| *F16L 3/10* | (2006.01) | |

(52) U.S. Cl.
CPC ........ *F01N 13/1805* (2013.01); *F01N 3/0211* (2013.01); *F01N 3/20* (2013.01); *F01N 3/2842* (2013.01); *F01N 3/2853* (2013.01); *F01N 3/2867* (2013.01); *F01N 13/08* (2013.01); *F16L 3/1058* (2013.01); *F01N 2350/06* (2013.01); *Y02T 10/20* (2013.01)

(58) Field of Classification Search
CPC .... F01N 13/08; F01N 13/1805; F01N 3/0211; F01N 3/20; F01N 3/2842; F01N 3/2853; F01N 3/2867; F01N 2350/06; F16L 3/1058

USPC .................................................. 60/299, 324
See application file for complete search history.

(56) References Cited

U.S. PATENT DOCUMENTS

| | | | | |
|---|---|---|---|---|
| 4,393,559 | A * | 7/1983 | Heckethorn | F01N 13/1805 24/277 |
| 4,643,458 | A * | 2/1987 | Ammar | F01N 13/1805 180/296 |
| 7,501,005 | B2 * | 3/2009 | Thaler | B01D 46/001 285/407 |
| 2011/0042546 | A1 * | 2/2011 | Beatty | F01N 3/0211 248/603 |

FOREIGN PATENT DOCUMENTS

| | | |
|---|---|---|
| DE | 103 00 780 A1 | 7/2004 |
| DE | 10 2004 051 512 A1 | 5/2006 |
| DE | 60 2005 004 455 T2 | 1/2009 |
| JP | 2000 018029 A | 1/2000 |
| JP | 2009-150242 A | 7/2009 |
| WO | 2011/066041 A1 | 6/2011 |

OTHER PUBLICATIONS

Machine Translation JP 2000-018029 Done Sep. 15, 2016.*

* cited by examiner

*Primary Examiner* — Mark Laurenzi
*Assistant Examiner* — Dapinder Singh
(74) *Attorney, Agent, or Firm* — McGlew and Tuttle, P.C.

(57) ABSTRACT

A support ring (36) for an exhaust gas duct system, especially of an internal combustion engine of a vehicle, comprises a support element body (40) with a plurality of body segments (46, 48) and with a support arrangement (42) connecting the body segments (46, 48) to one another.

18 Claims, 2 Drawing Sheets

SUPPORT RING FOR AN EXHAUST GAS DUCT SYSTEM

CROSS REFERENCE TO RELATED APPLICATIONS

This application claims the benefit of priority under 35 U.S.C. §119 of German Patent Application DE 10 2015 100 552.2 filed Jan. 15, 2015, the entire contents of which are incorporated herein by reference.

FIELD AND BACKGROUND OF THE INVENTION

The present invention pertains to a support ring, which can be used, for example, in an exhaust gas duct system of an internal combustion engine of a vehicle in order to generate a support action for an exhaust gas treatment device, for example, a catalytic converter device provided in the exhaust gas duct system.

SUMMARY OF THE INVENTION

The object of the present invention is to provide a support ring for an exhaust gas duct system that can generate a reliable support action, for example, for an exhaust gas treatment device in an exhaust gas duct system of an internal combustion engine of a vehicle with simple manufacturability.

According to the present invention, this object is accomplished by a support ring for an exhaust gas duct system, especially of an internal combustion engine of a vehicle, comprising a support element body with a plurality of body segments and a support arrangement connecting the body segments to one another.

Since, in the support ring according to the present invention, the support element body comprises a plurality of body segments, i.e., is constructed with a plurality of components together providing the support element body, each of these body segments can be generated in a simple, but at the same time precise manner, for example, by shaping a metal sheet blank, such that the support element body in its entirety can be constructed, for example, with a circular-ring-like structure and with a plurality of body segments following one another in the circumferential direction. Since none of the body segments has to extend over the entire circumferential area, these body segments can also be provided with high production precision in the basically curved configuration, such that, on the one hand, a reliable support action radially outward can be generated in order to be able to hold the support ring in an exhaust gas duct element, and, on the other hand, however, the support action for an exhaust gas treatment device can also be reliably generated.

In order to be able to provide the structural cohesion of the support ring in a simple manner, it is suggested that at least two body segments be adjacent to one another in opposing body segment areas, and that the support arrangement connect the body segments to one another. In the support ring according to the present invention, the support arrangement thus fulfils not only the functionality for supporting, for example, an exhaust gas treatment device, but also ensures that the constructed body segments, which are basically separated from one another, are connected to one another.

In order to be able to avoid the development of restraints during the incorporation of a support ring according to the present invention in a, for example, tubular exhaust gas duct element, it is suggested that a gap be formed between the body segment areas.

At least one, and preferably each body segment is advantageously designed with a U profile, with the support arrangement being at least partially accommodated in a U profile interior space.

In order to be able to provide or not to compromise the support interaction of the support element, for example, with an exhaust gas treatment device, it is further suggested that the U profile have a radially inner U leg, a radially outer U leg and a connection area connecting the U legs, and that one U leg, and preferably the radially inner U leg, be shorter than the other U leg. In this connection, the support arrangement advantageously extends in the direction away from the connection area at least beyond the shorter U leg.

For support interaction, for example, with an exhaust gas treatment device, it is suggested that the support arrangement be flexible. It advantageously also has a ring-like, preferably closed ring-like design (ring configuration), such that the support action over the entire circumferential area can be obtained, on the one hand, but the cohesion of the individual body segments of the support element body is also achieved, on the other hand.

In order to guarantee a cost-effective manufacturability, but also to obtain a structure that is suitable for a comparatively corrosive environment in an exhaust gas duct system, on the other hand, it can be further suggested that at least one body segment, preferably each body segment, be configured as a shaped sheet metal part.

In order to design the support arrangement suitable for the comparatively corrosive environment as well, it is suggested that this support arrangement be made with wire material, and preferably with wire mesh, i.e., generally with a material, which provides a solid body, e.g., made of a plurality of wire filaments.

In order to guarantee a stable cohesion, it is suggested that at least one body element, and preferably each body element, be rigidly connected to the support arrangement, preferably by means of frictional connection or/and material connection.

The present invention pertains, further, to an exhaust gas duct assembly unit for an exhaust gas duct system, especially for an internal combustion engine of a vehicle, comprising a tubular exhaust gas duct element, an exhaust gas treatment device, preferably a catalytic converter device arranged in the exhaust gas duct element, as well as a support ring having the structure described above at at least one end area of the exhaust gas treatment device.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 4:
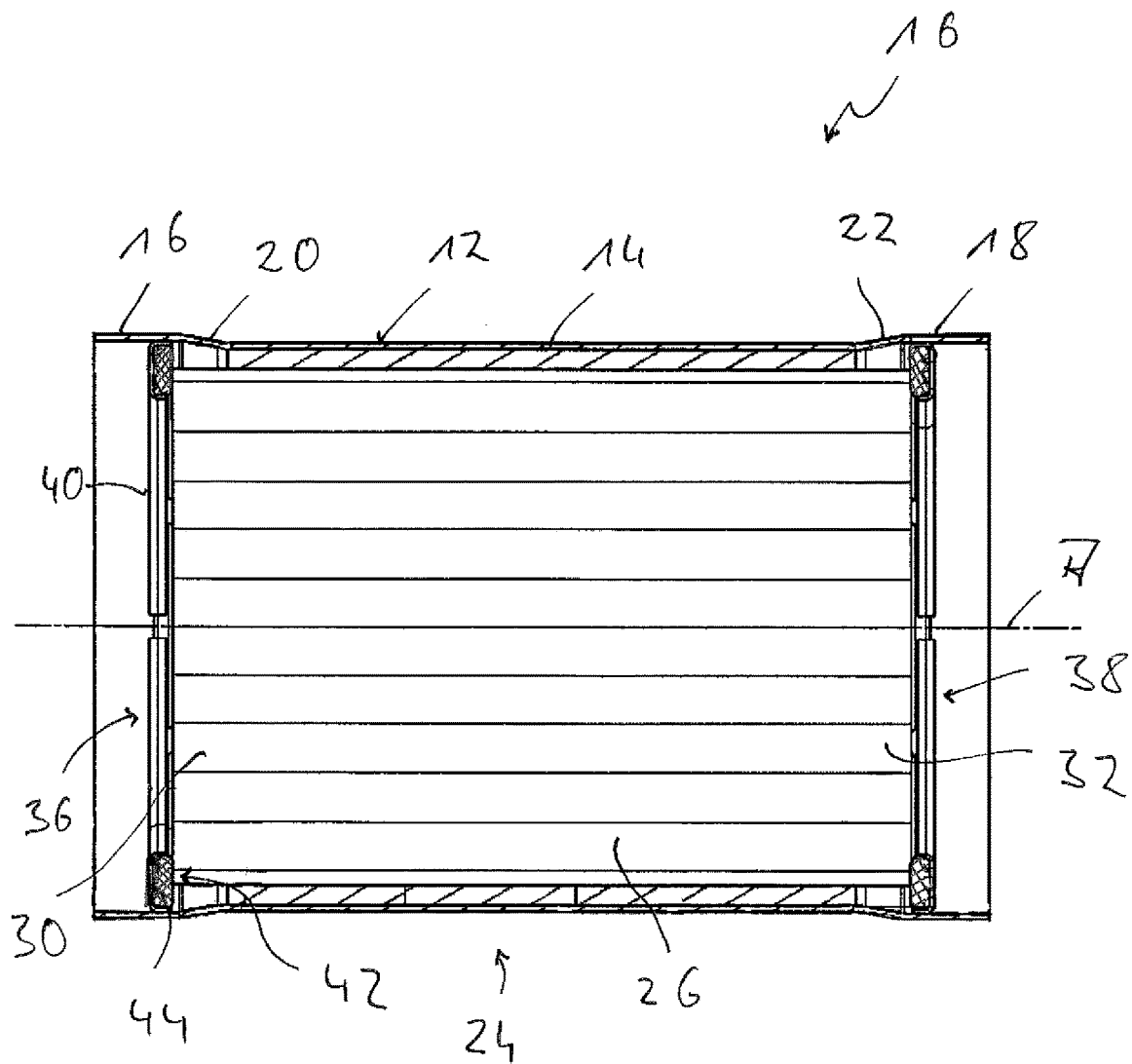
FIG. 4 is a longitudinal sectional view of an exhaust gas duct assembly unit for an exhaust gas duct system.

Referring to the drawings, FIG. 4 shows an exhaust gas duct assembly unit 10 intended for an exhaust gas duct system. This exhaust gas duct assembly unit 10 comprises a tubular exhaust gas duct element 12. The tubular exhaust gas duct element 12 has an essentially cylindrical central section 14 as well as preferably corresponding cylindrical end sections 16 and 18 at both end areas. A, for example, cone-like expansion area 20 or 22 is provided in the transition from the central section 14 to the respective end sections 16, 18.

An exhaust gas treatment device, for example, a catalytic converter device, generally designated by 24, is provided in the exhaust gas duct element 12. This comprises a catalytic converter unit 26, for example, with a substrate and catalyst material carried thereon. On its outer circumferential area, the catalytic converter unit 26 is enclosed by a mounting mat 28, i.e., a mat-like, flexible material, which also holds the catalytic converter unit 26 firmly essentially in the central section 14 by means of pressing action.

A support ring 36, 38 each is provided in association with at least one of the two end areas 30, 32 of the exhaust gas treatment device 24, which end areas 30, 32 are situated in the direction of the longitudinal axis A of the exhaust gas duct assembly unit 10. Each support ring 36, 38 is supported by press fit radially outward on the inner circumference of a corresponding end section 16, 18 of the exhaust gas duct element 12 and is held in the exhaust gas duct element 12 in this way. Each support ring 36, 38 overlaps the radial outer edge area of the catalytic converter unit 26 in the axial direction. In this way, in addition to the pressed holding in the central section 14 of the exhaust gas duct element 12 already mentioned above, a further contribution is made for a supporting action for the catalytic converter unit 26 or generally the exhaust gas treatment device 24. Further, it is advantageous that protection against corrosion is achieved in this area by overlapping the radial outer edge area of the catalytic converter unit 26.

Each support ring 36, 38 is constructed with a support element body 40, which is designed, for example, as a shaped sheet metal part, and which is designed with a U profile in cross section. A support arrangement 42, which may comprise, for example, a support element made of wire mesh, is provided in the U profile interior space. This flexible support element 44 supports the catalytic converter unit 26 axially, without compromising its structural integrity, especially the catalyst material.

An exhaust gas duct assembly unit 10, in which a support ring constructed according to the present invention can be used, was described above with reference to FIG. 4, such that reference can be made to the explanations in this regard. The structure of the support ring, which can be used, for example, as a support ring 36 or a support ring 38 in the structure shown in FIG. 4, is described below with reference to FIGS. 1 through 3. Reference may be made below to the support ring 36 as an example.

Figure 1:
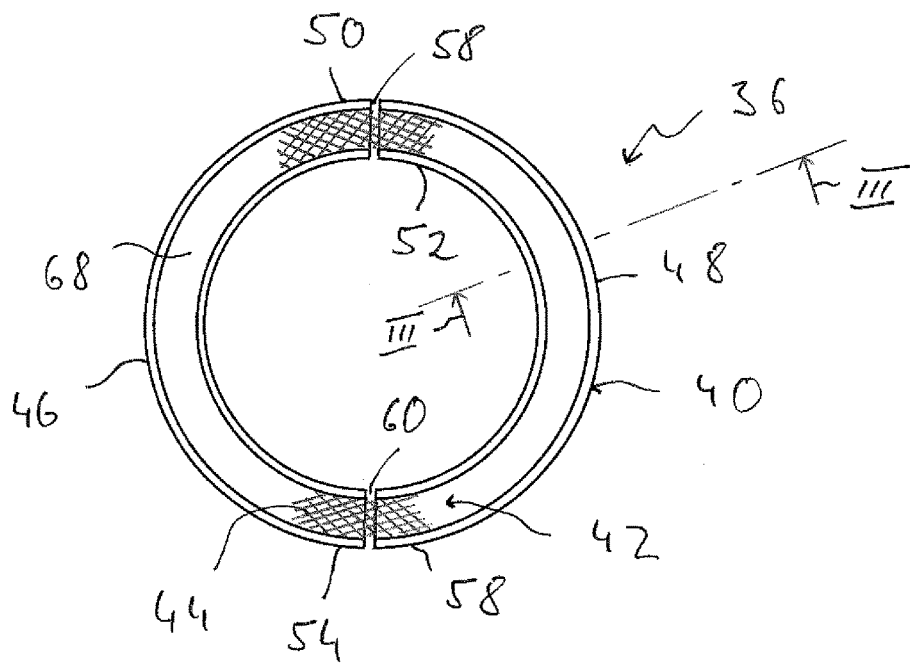
FIG. 1 is a top view of a support ring of a first embodiment.

FIG. 1 shows a design, in which the support ring 36 has a support element body 40 with two body segments 46, 48. Each of the body segments 46, 48 has a circular-ring-segment-like design and extends almost over an angle range of 180°. The corresponding body segment areas 50, 52, 54, 56 of the two body segments 46, 48 are located opposite one another while maintaining a gap 58, 60 with a circumferential distance, i.e., they are adjacent to one another in these areas.

Figure 3:
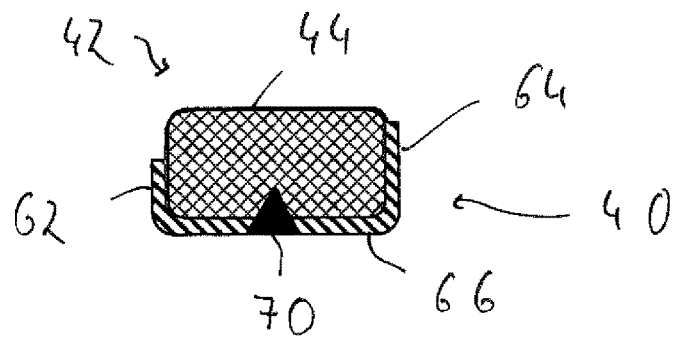
FIG. 3 is a cross-sectional view of the support ring of FIG. 1, cut along a radial line III-III in FIG. 1.

As FIG. 3 shows this in an example based on the body segment 48, the support element body 40 is or the body segments 46, 48 are designed with a U profile in cross section. With regard to the ring structure, they comprise a radially inner U leg 62 and a radially outer U leg 64. These two U legs 62, 64, extending, for example, essentially parallel to one another, are connected to one another by a connection area 66 with a, for example, essentially flat design. Each of the body segments 46, 48 can be provided as a shaped sheet metal part in a simple manner. Since none of the body segments 46, 48 extends essentially over an entire circumferential area, these body segments 46, 48 may also be provided essentially free from deflection in the manufacturing method described above.

The support element 44 of the support arrangement 42 already mentioned above is inserted into a corresponding U profile interior space 68 of the support element body 40 or of the body segments 46, 48. The support element 44, which is made, for example, with wire material, for example, wire mesh or the like, extends preferably essentially in a ring-like manner and free from interruption over the entire circumference of the support element body 40 and especially bridges over the gaps 58, 60. In this way, the two body segments 46, 48 are held together for providing the ring-like structure of the support ring 36.

In order to achieve a stable connection of the support element 44 to the body segments 46, 48, this support element 44 can be pressed into the U profile interior space 68 at a plurality of circumferential positions, for example, by local pressing of the mesh structure of the support element 44, such that it is in contact with the U legs 62, 64 while frictionally pressing and is held against slipping out. As an alternative or in addition, a material connection can be generated by welding 70 especially at these pressing areas. Especially the pressing areas mentioned above are suitable for this, since the mesh structure of the support element 44 is compressed in these areas and thus better conditions are created for the flow of current for a welding operation. At least two such connection areas are preferably created in each of the two body segments 46, 48.

It is clearly seen in FIG. 3 that the two U legs 62, 64 have different lengths of extension starting from the connection area 66. The radially inner of the two U legs 62, 64 is shorter than the radially outer one. As this can be seen in FIG. 4, it is thus guaranteed that the outer edge area of the catalytic converter unit 26 ending approximately in the radial central area of the support element 44 can be axially supported at the support element 44, but the radially inner U leg 62 still has an axial distance to the catalytic converter unit 26, such that the support interaction is not compromised.

Figure 2:
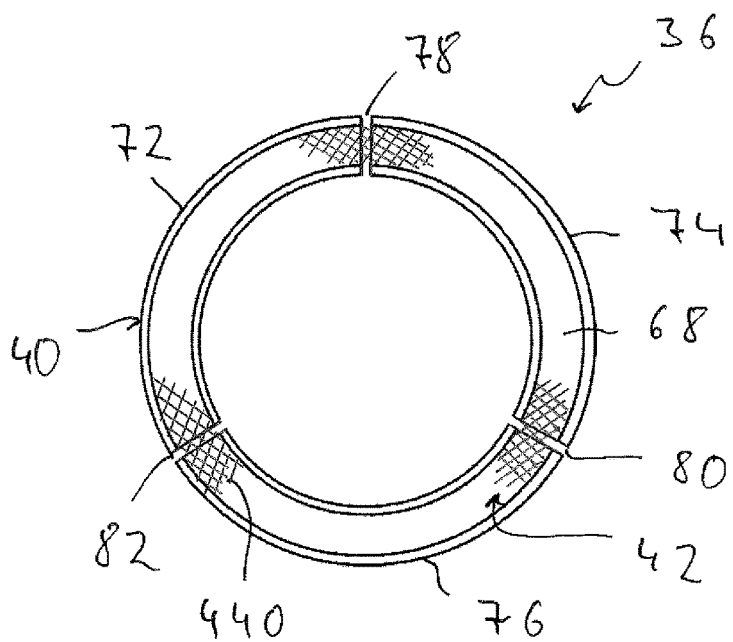
FIG. 2 is a top view of a support ring of a second embodiment.

An alternative embodiment of the support ring 36 is shown in FIG. 2. In this case, the support element body 40 is constructed with three body segments 72, 74, 76 and respective gaps 78, 80, 82 formed between them. In this case as well, the structural cohesion of the body segments 72, 74, 76 is provided by the support element 44 of the support arrangement 42, which support element 44 extends preferably over the entire circumference in the U profile interior space 68. Each of the body segments 72, 74, 76 has a circumferential extension over an angle range of about 120°, such that these body segments 72, 74 and 76 can still be provided with high production precision without the risk of warping during the shaping of a metal sheet blank. Just as in the embodiment described above, all body segments are preferably of identical design to one another, so that the number of different components to be kept available for producing such a support ring is small.

With the design of a support ring according to the present invention, it is possible to provide, with a structure that is simple, but at the same time can be produced with precision, a means, which can reliably hold an exhaust gas treatment device, for example, a catalytic converter device, in a tubular exhaust gas duct element of an exhaust gas duct system of an internal combustion engine and especially also can provide a protective action against corrosion in the radially outer edge area. Due to the flexibility also in the circumferential and thus radial direction, which is provided based on the structure according to the present invention, it is, moreover, ensured that the support element itself is reliably held in a tubular exhaust gas duct element, without additional fastening measures being necessary for this.

While specific embodiments of the invention have been shown and described in detail to illustrate the application of the principles of the invention, it will be understood that the invention may be embodied otherwise without departing from such principles.

What is claimed is:

1. An exhaust gas duct system support ring for an exhaust gas duct system of an internal combustion engine of a vehicle, the support ring comprising:
   a support element body comprising a plurality of body segments, wherein all body segments have a U-profile design with a U-profile;
   a flexible support arrangement comprised of a wire mesh connecting the body segments to one another, wherein the support arrangement is at least partially accommodated in a U-profile interior space of the U-profile, wherein at least one body segment of the plurality of body segments is rigidly connected to the support arrangement by a frictional connection by local pressing of the mesh wire of the support arrangement.

2. An exhaust gas duct system support ring in accordance with claim 1, wherein:
   at least two body segments of the plurality of body segments are adjacent to one another in opposing body segment end areas; and
   the support arrangement connects the body segments to one another with the opposing body segment end areas adjacent to one another.

3. An exhaust gas duct system support ring in accordance with claim 2, wherein a gap is formed between the body segment end areas.

4. An exhaust gas duct system support ring in accordance with claim 1, wherein:
   the U profile has a radially inner U leg, a radially outer U leg and a connection area portion connecting the U legs; and
   the radially inner U leg is shorter than the radially outer U leg.

5. An exhaust gas duct system support ring in accordance with claim 4, wherein the support arrangement extends in a direction away from the connection area at least beyond the shorter U leg.

6. An exhaust gas duct system support ring in accordance with claim 1, wherein the support arrangement has a ring configuration or at least one body segment comprises a sheet metal part or any combination of the support arrangement is flexible, the support arrangement having a ring configuration and at least one body segment comprising a sheet metal part.

7. An exhaust gas duct system support ring in accordance with claim 1, wherein at least one body segment of the plurality of body segments is rigidly connected to the support arrangement by a material connection or by both the frictional connection and the material connection.

8. An exhaust gas duct assembly unit for an exhaust gas duct system for an internal combustion engine of a vehicle, the exhaust gas duct assembly unit comprising:
   a tubular exhaust gas duct element;
   an exhaust gas treatment device arranged in the exhaust gas duct element; and
   a support ring at at least one end area of the exhaust gas treatment device, the support ring comprising a support element body comprising a plurality of body segments, wherein all body segments have a U-profile design with a U-profile; and
   a flexible support arrangement connecting the body segments to one another, said flexible support arrangement comprising a wire mesh, wherein the flexible support arrangement is at least partially accommodated in a U-profile interior space of the U-profile, wherein at least one body segment of the plurality of body segments is rigidly connected to the flexible support arrangement by a frictional connection by local pressing of the mesh wire of the flexible support arrangement.

9. An exhaust gas duct assembly unit in accordance with claim 8, wherein the exhaust gas treatment device comprises a catalytic converter device.

10. An exhaust gas duct assembly unit in accordance with claim 9, wherein:
    at least two body segments of the plurality of body segments are adjacent to one another in opposing body segment end areas; and
    the support arrangement connects the body segments to one another with the opposing body segment end areas adjacent to one another.

11. An exhaust gas duct assembly unit in accordance with claim 10, wherein a gap is formed between the body segment end areas.

12. An exhaust gas duct assembly unit in accordance with claim 8, wherein:
    the U profile has a radially inner U leg, a radially outer U leg and a connection area portion connecting the U legs; and
    the radially inner U leg is shorter than the radially outer U leg.

13. An exhaust gas duct assembly unit in accordance with claim 12, wherein the support arrangement extends in a direction away from the connection area at least beyond the shorter U leg.

14. An exhaust gas duct assembly unit in accordance with claim 9, wherein the support arrangement has a ring configuration or at least one body segment comprises a sheet metal part or any combination of the support arrangement is flexible, the support arrangement having a ring configuration and at least one body segment comprising a sheet metal part.

15. An exhaust gas duct assembly unit in accordance with claim 9, wherein at least one body segment of the plurality of body segments is rigidly connected to the support arrangement a material connection or by both the frictional connection and the material connection.

16. An exhaust gas duct system support ring for an exhaust gas duct system of an internal combustion engine of a vehicle, the support ring comprising:

a support element body comprising a plurality of body segments, wherein all body segments have a U-shaped interior space;

a flexible support arrangement comprising a wire mesh, each of said plurality of body segments being connected to another one of said plurality of body segments via said wire mesh, said support arrangement being at least partially arranged in said U-shaped interior space of at least one of said plurality of body segments such that at least a portion of said wire mesh deforms to define a frictional connection for connecting said flexible support arrangement and said at least one of said plurality of body segments, wherein said at least one body segment of said plurality of body segments is rigidly connected to said support arrangement via said frictional connection.

17. An exhaust gas duct system support ring in accordance with claim 16, wherein a gap is formed between end areas of said plurality of body segments, said wire mesh bridging said gap between said end areas of said plurality of body segments.

18. An exhaust gas duct system support ring in accordance with claim 17, wherein said plurality of body segments comprises a first body segment, a second body segment and a third body segment, each of said first body segment, said second body segment and said third body segment being located at a spaced location from each other, wherein a first gap is defined between said first body segment and said second body segment, a second gap is defined between said second body segment and said third body segment and a third gap is defined between said first body segment and said third body segment, said wire mesh bridging said first gap, said second gap and said third gap.

* * * * *